United States Patent [19]

Molnar et al.

[11] 4,282,756

[45] Aug. 11, 1981

[54] APPARATUS FOR ESTIMATING THE STRAIN ON AN INACCESSIBLE PORTION OF A ROTATING SHAFT

[75] Inventors: Albert J. Molnar, Trafford; Fred H. Wolff, Penn Township, Allegheny County; Donald G. Ramey, Churchill Borough, all of Pa.

[73] Assignee: Westinghouse Electric Corp., Pittsburgh, Pa.

[21] Appl. No.: 56,368

[22] Filed: Jul. 10, 1979

[51] Int. Cl.³ ............................................. G01N 29/00
[52] U.S. Cl. ................................. 73/650; 73/862.34
[58] Field of Search ............ 73/650, 136 R; 364/494; 322/99

[56] References Cited

U.S. PATENT DOCUMENTS

| | | | |
|---|---|---|---|
| 3,934,459 | 1/1976 | Wolfinger et al. | 73/650 |
| 4,051,427 | 9/1977 | Kilgore et al. | 73/650 |
| 4,057,714 | 11/1977 | Fork et al. | 73/136 R |

OTHER PUBLICATIONS

Bowler et al., IEEE Transactions of Power Apparatus & Systems, vol. PAS-97, #5, Sep./Oct. 1978, pp. 1489-1496.

Translation of a Lecture on the Meeting "Kraftwerk--Generatoren" (Turbine Generators) Nov. 8-9, 1977, Mannheim (Fed. Rep. of Germany.

*Primary Examiner*—Anthony V. Ciarlante
*Attorney, Agent, or Firm*—M. J. Moran

[57] ABSTRACT

This invention concerns apparatus for reliably estimating the strain on an inaccessible portion of a shaft of a turbine generator system which is susceptible to torsional oscillation. The strain is continuously predicted on a real time basis as a function of the modal analysis parameters of the shaft. Furthermore, system torque is detected electrically at the output of the generator. This signal along with signals representative of shaft angular velocity at the easily accessible ends thereof is provided to the modal analysis means as inputs. The provision of these latter system data allow for the elimination of an equal number of unknowns in the modal analysis representation, thus reducing the complexity of the analyzing system and increasing the reliability.

22 Claims, 5 Drawing Figures

APPARATUS FOR ESTIMATING THE STRAIN ON AN INACCESSIBLE PORTION OF A ROTATING SHAFT

BACKGROUND OF THE INVENTION

The subject matter of this invention relates generally to strain estimating apparatus and more particularly to apparatus for ascertaining when an inaccessible portion of a turbine generator system shaft will break.

It has been observed in connection with electrical turbine generator systems that the capability exists for mechanical torsional oscillations to be produced along portions of the shaft of the mechanical system which could cause shaft damage or fracture. Torsional monitoring systems have been provided to maintain a record of the disturbances that occur on machines due to transmission system faults such as short circuits, transmission system switching, out-of-phase synchronizing accidents and transient disturbances in series capacitor compensating electrical systems which are interconnected with the turbine generator system. With each of these types of disturbances the generator is subject to a high amplitude torsional shock together with transient oscillatory torque components. The frequency of the torque oscillations depends upon the type of transient and the components of the electrical system. The decay rate of these oscillations is primarily determined by the characteristic of the electrical system, but it can be influenced by the interaction of the torsional mechanical system of the turbine generator rotor. Initial torque amplitudes are dependent upon the type of disturbance, the configuration of the transmission system, and the location of the disturbance. It has been observed that disturbances of the type previously described frequently excite torsional natural frequencies of the rotor systems. Such excitation can cause torsional stresses at critical locations along the shaft which exceed the fatigue endurance limits of the shaft materials. Once the limit is exceeded theoretical analyses and sample tests have demonstrated that fatigue life is expended. The effects of repeated disturbances of the types described are cumulative and can, over a period of time, lead to a failure in the form of fatigue cracks appearing in the shafts. It is therefore desirous to provide torsional oscillation monitoring systems for the rotating mechanical system. The addition of a torsional monitoring system will provide a cumulative record of fatigue life expended, to provide information on the relative severity of different types of shock so that system operators can modify unsafe practices, and to provide information to show which portions of the shaft system should be carefully inspected during maintenance periods or following particularly severe disturbances. It has been observed that when this phenomenon occurs the rotating masses on the common turbine-generator shaft torsionally oscillate one with respect to the other, to the extent that interconnecting portions of the shaft are exposed to significant strain. As the strain increases, a limit in the metallurgical properties of the shaft is reached at which the shaft breaks. For obvious reasons, the fracture of a shaft rotating at speeds approximately thirty-six hundred revolutions per minute is very undesirous. The aforementioned has interested the designers, manufacturers, and producers of rotating electrical equipment of this kind since the first shaft break was discovered. Significant efforts have been put forth to attempt to solve the problem of the undesired shaft breakage or other damage. A solution for the aforementioned problem is constant direct monitoring of the strain on the shaft. Theoretically, the idea is workable, unfortunately though problems exist which usually prevents the implementation of the theory in a convenient and easy manner. Specifically, most portions of the shaft are so situated relative to the rotating masses and the protective shrouds, shields, and the like associated therewith that direct monitoring is difficult or impossible. In the past, therefore, apparatus was developed for indirect monitoring of shaft characteristics for detecting when that level of shaft strain is approached where shutdown and replacement or similar corrective action is necessary. For purposes of simplicity, the aforementioned approach is sometimes referred to as the "lumped parameter approach". An example of this approach can be found in U.S. Pat. No. 4,051,427, issued Sept. 27, 1977 to L. A. Kilgore et al. and assigned to the assignee of the present invention. In this case, a parallel analog computer model which represents all or most of the elements of the rotating shaft is provided for utilization with detectable electromechanical variables such as local shaft torque and local shaft speed. This model provides a real time side-by-side representation of the actual mechanical system. It is coordinated at its inputs with measurable variables from the actual system so that it reacts in response thereto. In order to construct the analog model, various mechanical system parameters such as mass, shaft resilience, and damping are determined and utilized. For example, shaft resilience and shaft damping can be represented for that portion of the shaft between two arbitrarily chosen rotating masses. In the model thus produced, electrical sampling of those model regions which corresponds to inexessible regions in the turbine generator can be made to detect what oscillatory characteristics exist in the actual mechanical system. Records of strain, peak velocities and the like can be thus obtained, stored and otherwise utilized in some meaningful fashion to help provide useful, safe, non-destructive operation for the actual turbine generator. A system of this type is useful. However, as implemented in the prior art it has some disadvantages. One disadvantage lies in the fact tht a one-to-one correspondence between the actual shaft parameters and the model parameters is required. This means that for every mass on the shaft there should be a portion of the model directly related to that mass and so on for resilience, damping etc. This means that there must be at least as many elements in the model as there are in the shaft. For relatively complex electromechanical systems, the number of model units is proportional to the number of units in the large electromechanical system. This tends to increase the relative size and complexity of the model thus introducing all the problems associated with relatively complex systems including inaccuracies due to component variances, model stability, cost, etc. Furthermore, the relationship between the model and the actual system is such that it is not easy to decouple the effects of the various parameters one from the other. This means it is very difficult to determine which of the parameters in the actual system most contributes to the problem being detected in the model system. That is not to say that a problem cannot be detected if one arises, but merely to say that the cause of the problem cannot be easily isolated. It would seem that the next logical step for solving the kinds of problems previously described would be to separate the most significant parameters associated with the torsional oscillation problems for the purposes of providing monitoring systems that can be adjusted or modified without rebuilding or restructuring the electrical model. Observers of the torsional oscillation problem have sensed that one of the most significant contributing factors to the problem is a frequency phenomena. However, the lumped parameter system makes no provision for adjusting critical frequencies. Consequently, it would be advantageous if a monitoring and detecting system could be provided which was relatively accurate, inexpensive, and had a minimum of components. Furthermore, it would be desirous if this system somehow could be utilized to pinpoint or focus on portions of the electromechanical system which contribute most to the torsional oscillation problem. It would be even further advantageous if the concept of frequency could somehow be explicitly introduced into the output of the model so that certain less critical frequency values could somehow be eliminated without seriously affecting the solution. In the past, a model analysis technique has been utilized to attempt to introduce a frequency related concept into analysis of machine characteristics. This can be found in a paper entitled, "Mechanische Beanspruchung von Tubosaetzen Bli Elektrischen Stoerungen and Ploezlichen Lastaenderingen" by D. Lanabrecht and K. Large. The paper was presented at an ETG technical meeting on power plant generators, Mannheim, Germany, Nov. 8, 1977 (English translation in KWU Publication 442-101). Furthermore, the torsional stress analyzer which uses techniques related to those described in the aforementioned paper is taught in U.S. Pat. No. 4,057,714, entitled, "Durability or Service-Life Monitoring Device for Turbogenerator Shaft" by K. Fork et al., issued Nov. 8, 1977 on a German foreign priority date of Sept. 30, 1975. The modal analysis technique is utilized to represent a given number of rotating masses on a common shaft at a given frequency of rotation by a number of separate effective masses each vibrating at its own modal frequency and its own modal amplitude. This has the effect of introducing a frequency component into the input of the torsional analysis concept. However, in the teaching of the previous patent and paper, monitoring of data for each rotating mass in the actual system is required. Of course, this does not solve the problem of the inaccessibility of certain rotating masses. In other instances, a substitution of actual information about each rotating mass with secondary information (i.e. precalculated torque) related to each individual rotating mass is required. But, this of course has the same drawback as the "lumped parameter" model described previously. Furthermore, the required turbine moments are determined from steam pressures and valve positions for various high pressure, intermediate pressure and low pressure steam turbine stages. This increases the complication of the monitoring system and consequently the cost. Even though modal analysis is utilized for preliminary analysis in the later case, it does not appear to be utilized as an output in the electronic shaft torsional model. In a paper from the IEEE Transactions on Power Apparatus and Systems, Vol. PAS-97, No. 5, September/October 1978, entitled "The Navajo SMF Type Subsynchronous Resonance Relay", modal filters are used to provide a signal for relaying purposes. But, the signals are not recombined after passing through the modal filters so there can be no calculation of instantaneous shaft torque or stress with that system. This system is useful in providing information about individual modal frequencies, but because of the phase shifting effect of each filter it is not useful for generally instantaneously providing a complete picture of the modal response of the entire mechanical system. It would therefore be advantageous to find a system which utilized the modal analysis techniques in conjunction with an electronic shaft torsional model where a minimum number of inputs were required for accurate analysis to avoid the problem of the inaccessibility of certain portions of the turbine generator system for monitoring. It would be further advantageous if frequency related decoupling could be utilized in the model so that a determination of shaft strain and thus torsional fatigue could be related to the various frequencies of the torsional model. It would be even further advantageous if the component modal analysis data for certain frequencies could be instantaneously combined for a better representation of the effect of torsional oscillation.

SUMMARY OF THE INVENTION

In accordance with the invention, apparatus is taught for indirectly determining in a mechanical system the relative difference in instantaneous angular displacement between two rotating masses on a common resilient shaft to which is applied a driving torque and on which at least two other masses are accessible for direct monitoring, where there is a first monitoring means which is disposed to monitor the first of the other previously mentioned masses for providing a first monitoring means output signal which is related to the instantaneous angular displacement of the first other mass relative to a fixed reference. There is also provided a second monitoring means which is disposed to monitor the second of the other masses for providing a second monitoring means output signal which is related to the instantaneous angular displacement of the second other mass relative to a fixed reference. There is also provided a torque detecting means which is disposed to detect the previously mentioned torque and to provide an output signal related thereto. Solution means is also provided for interconnection with the torque means for utilizing the previously described torque means output signal as an input for thus generating the instantaneous value for a modal coordinate as a modal coordinate output signal in accordance with the continuous solution of a differential equation in which the modal coordinate and its first and second derivative are related to the previously described torque. Finally, there is provided a summing means which is interconnected with the first monitoring means, the second monitoring means and the previously described solution means for summing the signals from each to produce a summing means output signal which is related to the angular displacement between two rotating masses.

BRIEF DESCRIPTION OF THE DRAWINGS

In accordance with the invention, reference may be had to the preferred embodiment thereof shown in the accompanying drawings in which.

DESCRIPTION OF THE PREFERRED EMBODIMENTS

Figure 1:
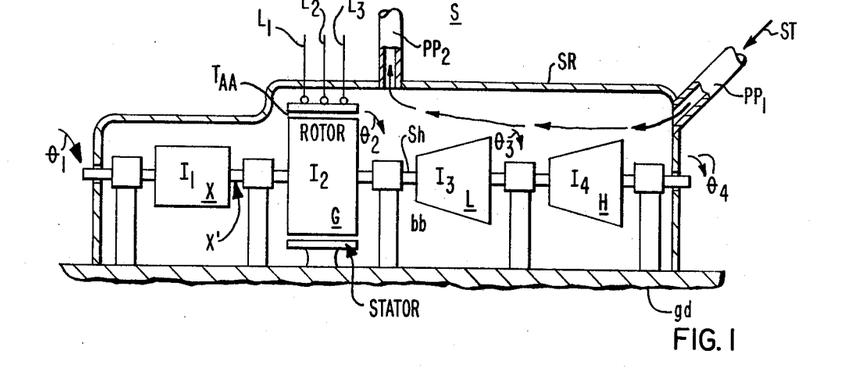
FIG. 1 shows a simplified schematic representation fo a system on which four masses rotate on a common shaft.

Referring now to the drawings and FIG. 1 in particular, a schematic representation of a four element steam turbine electrical generator system S is shown. The system may include a common shaft Sh supported by five longitudinally spaced-apart bearing support members bb. On the shaft Sh are four rotatable masses represented for convenience as $I_1$, $I_2$, $I_3$, $I_4$ to represent the rotating inertias of each of these masses. Inertia $I_1$ represents the inertia of the electrical exciter rotor X of the electrical portion of the system. Inertia $I_2$ represents the inertia of the electrical generator rotor portion G of the generator of the system. Inertia $I_3$ represents the inertia of the low pressure turbine rotor portion L of the system and inertia $I_4$ represents the inertia of the high pressure turbine rotor portion H of the system. In a schematic form, steam ST is shown entering an input port $PP_1$ for interaction with the vanes of the low and high pressure turbine sections represented by the inertias $I_3$ and $I_4$, respectively. The energy of the steam is transferred to torque for rotating the turbine sections. The spent steam is shown as exhaust EX from exhaust port $PP_2$. The torque applied to the turbine sections causes them to rotate thus rotating the shaft Sh which in turn causes the exciter and generator rotors represented by the inertias $I_1$ and $I_2$ to rotate providing an air gap torque $T_{AA}$ and electrical power to the lines $L_1$, $L_2$ and $L_3$. The exciter $I_1$ provides the normal generator excitation function well known in the art of electrical generation. An indication of the reaction of the electrical system to the applied torque produced by the movement of the steam ST past the veins of the turbine sections represented by the inertias $I_3$ and $I_4$ as well as external torque resulting from electrical system disturbances may be had by measuring the air gap torque $T_{AA}$ of the rotor of the generator. This measurement is best made by monitoring voltage across and current in the lines $L_1$, $L_2$ and $L_3$. The means for doing this is outlined, for example, in the previous U.S. Pat. No. 3,999,115 issued Dec. 21, 1976 to W. A. South et al. It is well known that the rotating masses represented by the various inertias previously described have mechanical vibration and resonance characteristics. These characteristics are related to shaft resilience, mass, spring damping, the friction of the bearings and similar parameters. Occasionally as is described in the previously mentioned U.S. Pat. No. 4,051,427, the electrical reaction of the circuit served by the lines $L_1$, $L_2$ and $L_3$ feeds back by way of the magnetic interaction between the stator and rotor of the generator to provide mechanical stimulation of the shaft. Regardless of the cause, however, at times the various masses of the shaft as represented by the inertias $I_1$, $I_2$, $I_3$ and $I_4$ begin to torsionally oscillate relative to each other. To be specific, the resilience of the shafts allow the various rotating masses to speed up and slow down at fixed angular frequencies which are characteristics of the unit's design. Consequently, at one instant of time the rotor represented by the inertia $I_2$ may be accelerating and attempting to travel at an angular velocity slightly faster than the average angular velocity of the shaft, while the exciter represented by the inertia $I_1$ may be attempting to slow down. This has the characteristics of introducing torsional strain at the point X', for example, due to the fact that the rotor is attempting to go faster than the shaft and the exciter is attempting to go slower than the shaft during a small increment of time. The magnitudes of the torsional oscillations, the relative frequencies, the resiliency of the shaft and other characteristics interact to the extent that a given set of conditions can be found at which the shaft will break at the location X', for example, because of the peak amplitude of the oscillations. In another case, the shaft Sh may be exposed to such strain as to cause fatigue thus leading to an eventual break. It has been found that accurate knowledge of the instantaneous angular displacement difference, $\theta_2 - \theta_1$, for example, between the instantaneous angular dispositions of the rotating masses in question can lead to a reasonable prediction as to the amount of fatigue which will eventually cause the shaft to crack or break. Unfortunately, the physical make-up and mechanical-electrical characteristics of the system S generally make it difficult to record or monitor the speeds $\theta_2$ and $\theta_3$, for example, during actual operation of the shaft because of the presence of a shroud SR or similar system enclosing means. Generally, the angular displacements $\theta_1$ and $\theta_4$ are known by taking the integral of the angular velocity at either end of the shaft. The mechanical representation of the shaft shown in FIG. 1 can be reduced to a schematic representation of the interaction of spring constants, shaft dampings, applied torques, and rotational characteristics. This can be done for a shaft of any number of rotating masses.

Figure 2:
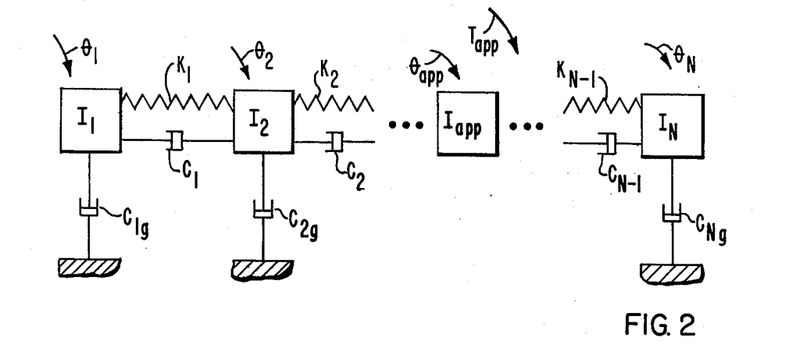
FIG. 2 shows a schematic representation of the apparatus shown in FIG. 1 in which representations of rotating mass, spring constants and damping are depicted.

Referring now to FIG. 2 a schematic representation of the rotational inertias, displacements, viscous damping and spring constants, etc., for an n element rotational system is shown. This is what is generally referred to as a general lumped parameter torsional model such as the type described previously in U.S. Pat. No. 4,051,427. This model which is mechanical in nature can be replaced by a suitable electrical analog (not shown). The electrical analog can then be excited with available angular velocity information which is related to angular velocities $\dot{\theta}_1$ and $\dot{\theta}_n$, for example, and with applied torque information $T_{app}$ which is related to electrical characteristics in the lines $L_1$, $L_2$ and $L_3$ of FIG. 1, for example. The thus excited electrical analog model may be monitored at critical points which are not available in the actual mechanical system for detecting values of $\theta_2$, $\theta_3$, etc. for thus predicting the amount of strain in the shaft at different places. This is essentially the kind of operation described previously with respect to U.S. Pat. No. 4,051,427.

Figure 3:
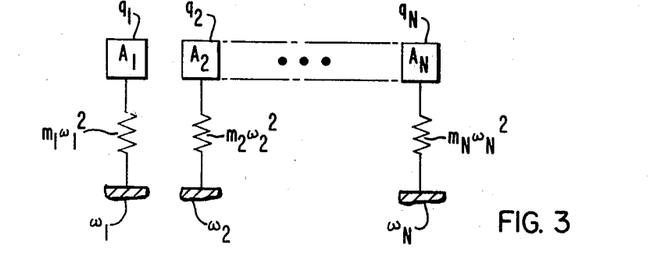
FIG. 3 shows a schematic representation of the modal transform of the schematically shown apparatus of FIG. 2.

Referring now to FIGS. 2 and 3, a mechanical representation (FIG. 3) of a system which is derived from taking a modal transform of the system of FIG. 2 is shown. The modal transform has the characteristic of representing a mechanical system in which a number of masses rotate on a common shaft at a given nominal angular velocity as a series of independent effective masses, $A_1$ through $A_n$ which oscillate at frequencies $\omega_1$ through $\omega_n$, respectively, through amplitudes $q_1$ through $q_k$, respectively, in accordance with the characteristics of springs having spring constants $A_1 \omega_1^2$ through $A_N \omega_n^2$, respectively. It is to be understood that the effective mass $A_1$, for instance, will have components thereof which may be related to portions of all of the masses associated with the inertias $I_1$ through $I_n$ of FIG. 2. For purposes of simplicity of illustration and to help understand that which is to follow, a list of definitions is presented below:

$I_i$—torsional viscous damping between the ith inertia and ground
$T_{app}$—applied torque to inertia where i=app
$I_{ga}$—generalized mass for the ath mode
$\theta_i$—angular displacement of inertia i
$\dot{\theta}_i$—angular velocity of inertia i
n—total number of system inertias
k—total number of system modes
$\omega_a$—natural frequency of mode a $(2\pi f_a)$
$\zeta_a$—damping ratio for mode a
$\phi_{i,a}$—modal displacement of inertia i in a mode a
$\Phi q_a$—modal coordinate of mode a
$[\Phi]$—modal matrix.

From normal mode theory, the physical displacements $\theta_1$ through $\theta_n$ of the various oscillations can be expressed in terms of vibration modes by the following:

$$[\theta_i] = [\Phi][q_a] \quad \begin{array}{l} i = 1,2,3,\ldots,n \\ a = 1,2,3,\ldots,k \end{array} \quad (1)$$

$$\begin{array}{l} \theta_1 = \phi_{1,1}q_1 + \phi_{1,2}q_2 + \ldots + \phi_{1,k}q_k \\ \theta_2 = \phi_{2,1}q_1 + \phi_{2,2}q_2 + \ldots + \phi_{2,k}q_k \\ \vdots \\ \theta_n = \phi_{n,1}q_1 + \phi_{n,2}q_2 + \ldots + \phi_{n,k}q_k \end{array} \quad (2)$$

Equation (1) is a mathematical representation of the fact that the matrix of angular displacements in the mechanical system of FIG. 2 is equal to the modal matrix times the matrix of the modal coordinates of mode "a" such as is shown in FIG. 3. With reference to FIG. 1 for example, it is clear that the end shaft angular velocity $\dot{\theta}_1$ and $\dot{\theta}_4$ and thus the instantaneous end shaft displacements $\theta_1$ and $\theta_4$ can be easily measured and thus known, even though other angular velocities and displacements are inaccessible. Furthermore, the torque $T_{AA}$ is also measurable as was described previously. Knowing the values of $\theta_1$ and $\theta_n$ and using them in the first and last rows of equation (2), it is possible to define two modal coordinates $q_r$ and $q_s$ in terms of $\theta_1$ and $\theta_n$ and the remaining unknown modal coordinates by the following:

$$\phi_{1,r}q_r + \phi_{1,s}q_s = \theta_1 - \sum_{i=1}^{k} \phi_{1,i}q_i \quad \begin{array}{l} i \neq r \text{ or } s \\ r \neq s \end{array} \quad (3)$$

$$\phi_{n,r}q_r + \phi_{n,s}q_s = \theta_n - \sum_{i=1}^{k} \phi_{n,i}q_i \quad \begin{array}{l} i \neq r \text{ or } s \\ r \neq s \end{array} \quad (4)$$

By rearranging, equations 5 and 6 follow:

$$q_r = \frac{\phi_{n,s}(\theta_1 - \sum_{i=1}^{k}\phi_{1,i}q_i) - \phi_{1,s}(\theta_r - \sum_{i=1}^{k}\phi_{n,i}q_i)}{(\phi_{1,r}\phi_{n,s} - \phi_{1,s}\phi_{n,r})} \quad \begin{array}{l} i \neq r \text{ or } s \\ r \neq s \end{array} \quad (5)$$

$$q_s = \frac{\phi_{1,r}(\theta_n - \sum_{i=1}^{k}\phi_{n,i}q_i) - \phi_{n,r}(\theta_1 - \sum_{i=1}^{k}\phi_{1,i}q_i)}{(\phi_{1,r}\phi_{n,s} - \phi_{1,s}\phi_{n,r})} \quad \begin{array}{l} i \neq r \text{ or } s \\ r \neq s \end{array} \quad (6)$$

As was mentioned previously, special interest lies in the relative motion between adjacent inertia from which stress and fatigue life calculations on shafts can be made if desired by subtracting one row from another in equation (2) and expressing the difference in terms of unknowns m and m+1 as can be seen in equation (7) which follows.

$$(\theta_{m+1} - \theta_m) = \sum_{i=1}^{k}(\phi_{m+1,i} - \phi_{m,i})q_i + (\phi_{m+1,r} - \phi_{m,r})q_r + (\phi_{m+1,s} - \phi_{m,s})q_s \quad (7)$$

where m=1,2,3 ... (n-1), i=1,2,3 ... k and i≠r or s.

By substituting equations (5) and (6) into equation (7) and rearranging the terms, equation (8) is derived.

$$(\theta_{m+1} - \theta_m) = \sum_{i=1}^{k} \left\{ [\phi_{m+1,i} - \phi_{m,i}] + \frac{1}{(\phi_{1,r}\phi_{n,s} - \phi_{1,s}\phi_{n,r})} \right. \quad (8)$$
$$\times [(\phi_{m+1,r} - \phi_{m,r})(\phi_{1,s}\phi_{n,i} - \phi_{n,s}\phi_{1,i})$$
$$\left. + (\phi_{m+1,s} - \phi_{m,s})(\phi_{n,r}\phi_{1,i} - \phi_{1,r}\phi_{n,i})]q_i \right\}$$
$$+ \frac{(\phi_{m+1,r} - \phi_{m,r})\phi_{n,s} - (\phi_{m+1,s} - \phi_{m,s})\phi_{n,r}}{(\phi_{1,r}\phi_{n,s} - \phi_{1,s}\phi_{n,r})}\theta_1$$
$$+ \frac{(\phi_{m+1,s} - \phi_{m,s})\phi_{1,r} - (\phi_{m+1,r} - \phi_{m,r})\phi_{1,s}}{(\phi_{1,r}\phi_{n,s} - \phi_{1,s}\phi_{n,r})}\theta_n$$

Equation (8) can be rewritten in simpler form as equation (9):

$$\theta_{m+1} - \theta_m = d_m\theta_1 + e_m\theta_n + \sum_{i=1}^{n} f_{m,i}q_i, \quad (9)$$

where i≠r or s, and where $$d_m = \frac{(\phi_{m+1,r} - \phi_{m,r})\phi_{n,s} - (\phi_{m+1,s} - \phi_{m,s})\phi_{n,r}}{(\phi_{1,r}\phi_{n,s} - \phi_{1,s}\phi_{n,r})}$$

$$e_m = \frac{(\phi_{m+1,s} - \phi_{m,s})\phi_{1,r} - (\phi_{m+1,r} - \phi_{m,r})\phi_{1,s}}{(\phi_{1,r}\phi_{n,s} - \phi_{1,s}\phi_{n,r})}$$

$$f_{m,i} = (\phi_{m+1,i} - \phi_{m,i}) + \frac{1}{(\phi_{1,r}\phi_{n,s} - \phi_{1,s}\phi_{n,r})}$$
$$[(\phi_{m+1,r} - \phi_{m,r})(\phi_{1,s}\phi_{n,i} - \phi_{n,s}\phi_{1,i}) +$$
$$(\phi_{m+1,s} - \phi_{m,s})(\phi_{n,r}\phi_{1,i} - \phi_{1,r}\phi_{n,i})]$$

The values $d_m$, $e_m$ and $f_{m,i}$ are defined above. These latter values are parametric and can be adjusted when necessary by changing pot settings in the analog model device. The modal coordinates $q_i$ may be obtained by solution of the differential equation which defines any mode of oscillation shown in FIG. 3. The differential equation is as follows:

$$\ddot{q}_a + 2\zeta_a\omega_a\dot{q}_a + \omega_a^2 q_a = \frac{T_{app}\phi_{app,a}}{I_{ga}} \quad (10)$$

By comparing equation (9) and equation (10) the following becomes clear: The instantaneous difference in angular displacement between any two masses on a shaft, and thus the amount of shaft strain, can be determined by knowing the end displacements for the shaft and by simultaneously solving for the remaining unknown modal coordinates by utilizing equation (10). Of course, if other information is somehow made available such as angular velocity for a non-accessible rotating mass, another mode $q_i$ may be eliminated.

Figure 4:
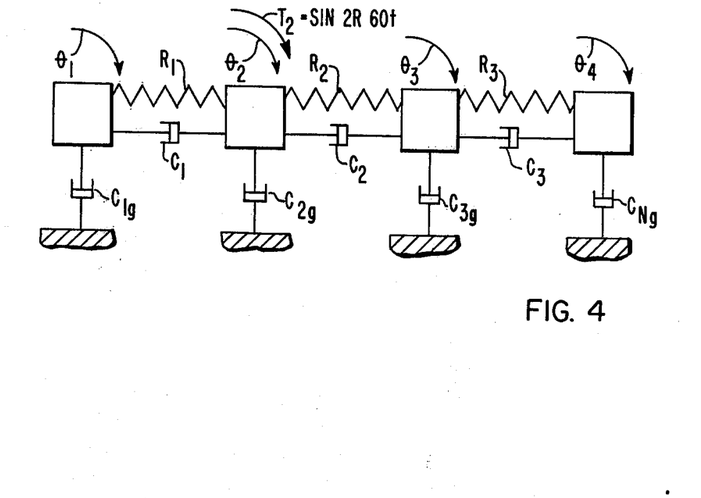
FIG. 4 shows a schematic representation similar to that shown in FIG. 2 for four rotating masses such as depicted in FIG. 1.

Referring now to FIG. 4, an illustrative turbine generator system which is representative of the four-rotating-mass system of FIG. 1 is depicted in a format similar to that shown in FIG. 2. Furthermore, Table 1 lists the mechanical system parameters shown in FIG. 2. Table 2 gives the appropriate parameters for solving the representative modal equations and the appropriate differential equations. Table 3 depicts the modal matrix $[\Phi]$. It should be remembered with regard to the frequencies depicted in the first row of Table 2 that they differ from the natural frequency of a mode by the conversion factor $2\pi$ or 6.28.

TABLE 1

| Element | Value | Units |
|---|---|---|
| $I_1$ (Exciter) t | 2256 | |
| $I_2$ (Generator), G | 30180 | |
| $I_3$ (L.P. Turbine), L | 84853 | in-lbs-sec$^2$ |
| $I_4$ (H.P. Turbine), H | 23779 | |
| $C_1$ | 500 | |
| $C_2$ | 2296 | in-lbs-sec |
| $C_3$ | 2296 | |
| $C_{1g}$ | 500 | |
| $C_{2g}$ | 14700 | |
| $C_{3g}$ | 22000 | in-lbs-sec |
| $C_{4g}$ | 9338 | |
| $K_1$ | 1.85 (10)$^8$ | |
| $K_2$ | 3.772 (10)$^8$ | (in-lbs)/RAD |
| $K_3$ | 3,857 (10)$^8$ | |

TABLE 2

| Mode a | 1 | 2 | 3 | 4 |
|---|---|---|---|---|
| $f_a$ | 0.0 | 18.31 | 24.35 | 47.53 |
| $L_a$ | .1440 | .00222 | .00161 | .00082 |
| $I_{ga}$ | 141068. | 36538. | 46390. | 2490. |

TABLE 3

| | Modal Matrix $[\Phi]$ | | | |
|---|---|---|---|---|
| Mode a | 1 | 2 | 3 | 4 |
| $\phi 1_a$ | 1.0 | 1.0 | .58022 | 1.0 |
| $\phi 2_a$ | 1.0 | .83864 | .41465 | −.08774 |
| $\phi 3_a$ | 1.0 | −.12870 | −.44314 | .00493 |
| $\phi 4_a$ | 1.0 | −.69940 | 1.0 | −.0011 |

Taking into consideration the information contained in Tables 1, 2 and 3 FIG. 4 as well as the preceding discussion, equations (11) through (14) result.

$$\theta_2 - \theta_1 = -1.0892\ \theta_1 - 1.3256\ \theta_4 + 1.792\ q_3 \quad (11)$$

$$\theta_3 - \theta_2 = -094329\ \theta_1 + 1.5168\ \theta_4 - 2.4293\ q_3 \quad (12)$$

$$\theta_4 - \theta_3 = 0.005137\ \theta_1 + 0.80876\ \theta_4 + 0.63736\ q_3 \quad (12)$$

and $$\ddot{q}_3 + 0.4917\ \dot{q}_3 + 23409\ q_3 = 0.41465\ T_2/46390.3 \quad (14)$$

It will be noted that on the right side of each of equations (11) through (13) the values $\theta_1$, $\theta_4$ and $q_3$ are presumed to be given whereas the values on the left side or the differences in instantaneous angular displacements are to be calculated. Furthermore, the value $q_3$ associated with the extreme right portion of equations (11) through (13) is provided by solution of the differential equation shown in equation (14). Ideally, this latter solution is provided by an analog computer or the like so that it may be introduced into the equations (11) through (13) continuously and instantaneously.

Figure 5:
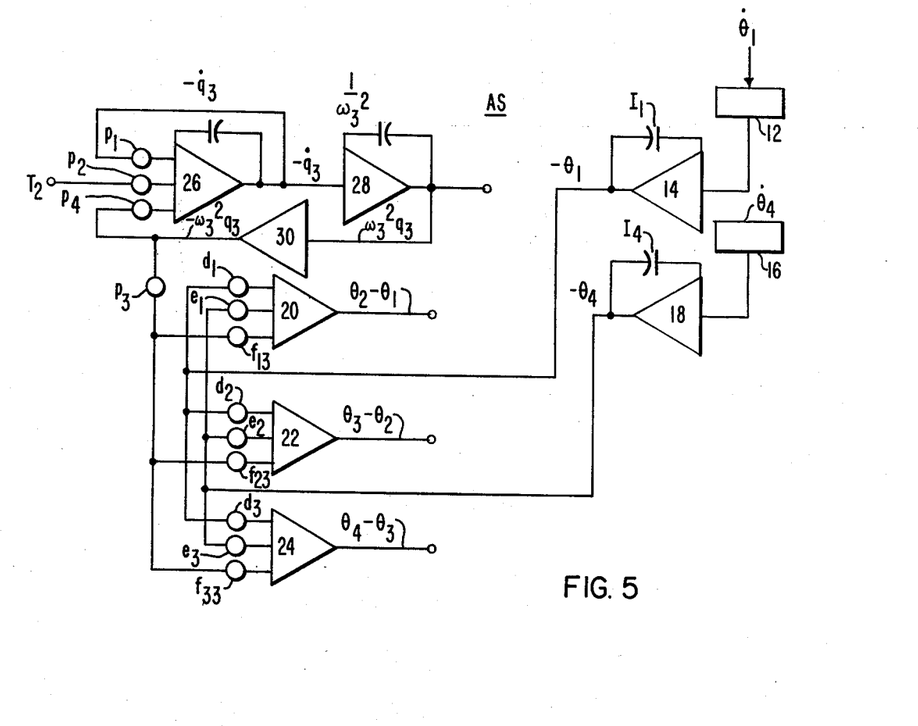
FIG. 5 shows an electrical analog for solving a modal transform of the schematically represented apparatus of FIG. 4 for thus determining instantaneous shaft displacement between rotating masses.

Referring now to FIG. 5, a representative electrical analog AS for the equations (11) through (14) is shown. It should be noted that the rigid body mode (i.e. lowest frequency mode) is generally omitted to reduce drifting. In addition, the system end shaft responses $\dot{\theta}_1$, $\dot{\theta}_4$ which are angular velocities, are fed back to the analog solver through filters 12 and 16, respectively, which are utilized to remove spurious low frequencies to reduce drift in the analog solution. In the case of FIG. 5, $\dot{\theta}_1$ is supplied by way of high pass filter 12 to an integrator 14 where the signal is converted to the negative of the angular displacement $\theta_1$. In a like manner, the angular velocity $\dot{\theta}_4$ is provided by way of high pass filter 16 through an integrator 18 to provide the negative of the angular displacement $\theta_4$. $\theta_1$ is provided simultaneously to inputs of summers 20, 22 and 24. In each case the value $\theta_1$ is multiplied by an appropriate constant $d_1$, $d_2$ and $d_3$, respectively. These values represent potentiometer settings for the analog computer. The value of the parameter d is explained with regard to equation (9). In a like manner, the value $-\theta_4$ is supplied simultaneously to each of the summers 20, 22 and 24 and are adjusted by potentiometer settings $e_1$, $e_2$ and $e_3$, respectively. The torque signal $T_2$ is provided by way of pot or potentiometer $P_2$ to one inut of a summing integrator 26. The output of the summing integrator is the value minus $\dot{q}_3$. This is fed back to another input of the summing integrator 26 through a potentiometer set at $P_1$. The value minus $q_3$ is fed to the lone input of another integrator 28. The signal minus $\dot{q}_3$ is integrated as shown in FIG. 5 to provide the value $\omega_3^2\ q_3$ as an output. This is provided to an inverter 30 which negates the last-mentioned value. This negated value is then provided by way of potentiometer $P_3$ to the previously described summers 20, 22 and 24 where it is multiplied by the pot settings $f_{13}$, $f_{23}$ and $f_{33}$, respectively as described with regard to equation (9). The output of the inverter 30 is also provided by way of an adjusting pot $P_4$ to the last input terminal of the summing integrator 26. Consequently, the summing integrator 26, the integrator 28 and the inverter 30 constitute a loop for solving the differential equation defined in equation (14). The output of the summer 20 is the difference value $\theta_2 - \theta_1$. The output of the summer 22 is the difference value $\theta_3 - \theta_2$ and the output of the summer 24 is the difference value $\theta_4 - \theta_3$. Consequently, it can be seen that the outputs of the summers 20, 22 and 24 are representative of the shaft strain between each of the rotating inertias of the apparatus depicted in FIG. 4 even though it is presumed to be difficult or impossible in some cases to actually measure all these values directly. The only values which can be directly measured in the latter case are the end shaft values $\dot{\theta}_1$ and $\dot{\theta}_4$ and the torque $T_2$ (by way of electrical system measurements).

A fixed base modal system can be used with modes calculated to a particular inertia which represents a fixed base. Test results to determine system frequencies can be obtained by locking the rotor in the system. Alternatively, the fixed base modal frequencies can be mathematically calculated from free-modal frequencies obtained from system tests. These results can then be used for tuning the fixed base modal analog. Assuming that $\theta_1$ is fixed in the illustrative system, the modal differential equation would be as shown in equation (15). In this case, the value $P_a$ is called the modal participation factor. All the other equations are similar to that shown with respect to the analogs of FIG. 5 and the system it represents in FIG. 4.

$$\ddot{q}_a + 2\zeta_a\omega_a\dot{q}_a + \omega_a^2 q_a = \frac{\phi_{2,a}\ T_2}{I_{ga}} + \omega_a^2 P_a \theta_1 \quad (15)$$

An analog can also be derived when relative motions or shaft strains are also available by subtracting the motions on either side of particular shaft $(\theta_{i+1} - \theta_i)$ in equation (2). The procedure of reducing or simplifying the analog is the same or similar to that derived with respect to equations (3) through (8). The right side of these equations would include shaft strain which is fed back along with other available feedbacks, such as $\theta_1$, $\theta_n$, etc. Acceleration feedbacks or inertia angular accelerations can be used to simplify the analog by differentiating equation (2) for example, twice with respect to time. The analog can then be reduced in the same manner as displacement feedbacks. Relative accelerations can be integrated twice to get relative displacement in the analog. Inertia acceleration feedbacks of the system can be integrated twice to get an angular feedback displacement then the derived equations apply for simplifying the analog.

Analysis of the foregoing leads one to the following conclusions: Apparatus has been developed for determining the relative shaft displacement between inaccessible members in a steam turbine electrical generator system. Various parameters of the actual system, such as inertia, spring damping, flexibility, can be premeasured or predetermined and then utilized in the calculation of parameters for a representative modal transform model. Various critical frequency numbers such as $\omega_1$, $\omega_2$, $\omega_3$, etc., can then be determined. Empirical observation has lead to the conclusion that the frequencies, $\omega_1$ through $\omega_n$ are critical portions of the analog system in regard to adjusting or correcting the analog system to make it more representative of the actual system. By adjusting one or two critical frequency values in the modal analog system, the analog system can be made to more accurately represent the actual system. An equivalent adjustment in a lumped parameter system is not easy for a number of reasons, the first of which lies in the fact that almost every lumped parameter will have to be changed to make an adjustment that is proper. Furthermore, the changes will have to be made on a trial and error basis. The lumped parameter system is generally adequate to point out that a discrepancy exists between the analog system and the real system but it is not generally adequate to easily define which of the parameters should be changed to bring the analog system and the real system into correspondence. The modal transform on the other hand has the characteristic of decoupling unknowns. This capability was not available in the prior art in regard to the lumped parameter system. It has been concluded by observation that since the frequency parameter tends to be the most significant, other parameters can sometimes be ignored when making adjustments. Furthermore, it has been observed that by coupling the concepts of Fourier analysis with the modal transform system certain of the resultant frequency components can be eliminated as being relatively unimportant. These can be ignored from the outset thus reducing the complication associated with the simultaneous equations in modal system variables used to represent the real system. Said in another way, this means that empirical observation and the like can be utilized to determine that frequency $\omega_4$ for example, may be very insignificant compared with frequency $\omega_2$, for example, in representing the modal characteristics of the system. Consequently, if one were to completely ignore the parameters and variables associated with frequency $\omega_4$, the remaining frequencies would still be very representative of the actual system. The frequencies which tend to be out of the range of importance are the higher frequencies. Furthermore, the zero frequency mode can be eliminated. This may be thought of as the steady-state or non-transient frequency against which all others are compared for determining the different values in angular displacement $\theta_3 - \theta_4$, for example. This is based on the assumption that the variable of interest is always the relative oscillatory displacement between two masses at any instant of time, not the underlying steady-state angular displacement resulting from unit loading. Consequently, this zero frequency mode can be eliminated from the calculations. This is usually not done in the prior art and introduces significant complication. The input data, such as the end shaft speed, act as a constraint upon the analog system which thus helps to improve the reliability of the analog system, because the end shaft data or the input data is known to be accurate (i.e., directly measured). This of course goes to simplifying the entire analog system by removing some of the unknowns contained therein. The analog system therefore tends to be a hybrid system as adequately demonstrated in equation (9) where it is clearly shown that the difference in angular displacement, such as shown on the left of equation (9) is related to known mechanical variables such as $\theta_1$ and $\theta_n$ and unknown but determinable model transfer values such as $q_i$. If all of the values of $\theta$ were known, the system would reduce to a trivial case in which all the $q_i$'s would be missing and the difference values in angular velocity could be quickly obtained by inspection. On the other hand, if all the inputs $\theta_i$ through $\theta_n$ were missing, then the difference values and angular displacement would be entirely a function of modal transforms, which would significantly complicate the calculations. Consequently as is adequately shown in equation (9), the system is biased towards being a hybrid system for balancing accuracy with ease of solution and efficiency.

The displacement differences shown at the outputs of the summers 20 through 25, FIG. 5, can be provided to an analyzer which in turn can provide an ongoing history of shaft displacement. The system for deriving the shaft differences may best be shown by noting the relationship between the apparatus of FIG. 1 and the apparatus of FIG. 4, for example. The hybrid characteristics of the system can be illustrated and highlighted. This is also evidence that the system is very much related to the interaction of the actual physical system and an analog system.

It is to be understood with respect to the embodiments of this invention that the invention is not limited to a turbine generator system. It is also to be understood that the invention is not limited to four rotating masses or five support bearings. It is also to be understood that the placement of the various masses on the shaft relative to one another is not limiting. It is also to be understood that the electrical characteristics of the exciter rotor portion of the turbine generator system is not limiting. It is also to be understood that the driving medium for the turbines of the turbo generator system is not limited to steam. It is also to be understood that the exact placement of the bearings for the turbine generator system is not limiting.

The apparatus taught with respect to the embodiments of this invention has many advantages. One advantage lies in the fact that the use of the modal transform concept allows for decoupling of the variables, one from the other, so that the analog may be more easily made to represent the actual system with accuracy. Another advantage lies in the fact that the analog system and the system it represents may be made to interact with each other for improving overall accuracy. Another advantage lies in the fact that the modal transform allows one to isolate modal frequency as a critical value in correcting for a difference between the analog system and the actual system it represents. Another advantage lies in the fact that the use of the modal transform with known parameters allows for ignoring insignificant modal frequency components.

What we claim is:

1. Apparatus for indirectly determining in a mechanical system the relative difference in instantaneous angular displacement $(\theta_{m+1} - \theta_m)$ between two rotating masses on a common resilient shaft to which is applied a driving torque $(T_{app})$ and on which two other masses are accessible for direct monitoring, comprising:
   (a) first monitoring means disposed to monitor the first of said other masses for providing a first monitoring means output signal which is related to the instantaneous displacement $\theta_1$ of said first other mass relative to a fixed reference;
   (b) second monitoring means disposed to monitor the second of said other masses for providing a second monitoring means output signal which is related to the instantaneous angular displacement $\theta_n$ of said second other mass relative to said fixed reference;
   (c) torque detecting means disposed to detect said torque for providing a torque means output signal which is related to said torque $(T_{app})$ at any instant of time;
   (d) solution means interconnected with said torque means and utilizing said torque means output signal as an input for generating the instantaneous value of a modal coordinate $(q_a)$ as a modal coordinate output signal in accordance with the continuous solution of the following differential equation:

$$\ddot{q}_a + K\dot{q}_a + K_1 q_a = K_2 T_{app}$$

where $K$, $K_1$ and $K_2$ are constants determined by the physical properties of said mechanical system and the normal mode transform; and
   (e) summing means interconnected with said first monitoring means, said second monitoring means and said solution means for summing said first monitoring means output signal, said second monitoring means output signal and said modal coordinate output signal to produce a summing means output signal which is related to the quantity $(\theta_{m+1} - \theta_m)$ even though the values $\theta_{m+1}$ and $\theta_m$ have not been directly measured.

2. Apparatus for indirectly determining in a mechanical system the relative difference in instantaneous angular displacement $(\theta_{m+1} - \theta_m)$ between two rotating masses on a common resilient shaft to which is applied a driving torque $(T_{app})$ and on which two other masses are accessible for direct monitoring, comprising:
   (a) first monitoring means disposed to monitor the first of said other masses for providing a first monitoring means output signal which is related to the instantaneous angular displacement $\theta_1$ of said first other mass relative to a fixed reference;
   (b) second monitoring means disposed to monitor the second of said other masses for providing a second monitoring means output signal which is related to the instantaneous angular displacement $\theta_n$ of said second other mass relative to said fixed reference;
   (c) modal coordinate determining means which is capable of determining a modal coordinate $(q_a)$ for said mechanical system and for generating a modal coordinant output signal which is related thereto; and
   (d) summing means interconnected with said first monitoring means, said second monitoring means and said modal coordinant determining means for summing said first monitoring means output signal, said second monitoring means output signal and said modal coordinant output signal to produce a summing means output signal which is related to the quantity $(\theta_{m+1} - \theta_m)$ even though the values $\theta_{m+1}$ and $\theta_m$ have not been directly measured.

3. The combination as claimed in claim 2 wherein said first monitoring means output signal is related to said instantaneous displacement $\theta_1$ by the value $d_m$.

4. The combination as claimed in claim 2 wherein said second monitoring means output signal is related to said instantaneous displacement $\theta_n$ by the value $e_m$.

5. The combination as claimed in claim 2 wherein said modal coordinate output signal is related to said modal coordinate $(q_a)$ by the value $f_m$.

6. Apparatus for indirectly determining in a mechanical system the relative difference in instantaneous angular displacement $(\theta_{m+1} - \theta_m)$ between any two adjacent rotating masses on a common resilient shaft to which is applied a driving torque $(T_{app})$ and on which the masses m and n, are accessible for direct monitoring, where mass m+1 is not mass n, comprising:
   (a) first monitoring means disposed to monitor the mass m for providing a first monitoring means output signal which is related to the instantaneous displacement $\theta_m$ of said mass m relative to a fixed reference;
   (b) second monitoring means disposed to monitor said mass n for providing a second monitoring means output signal which is related to the instantaneous displacement $\theta_n$ of said mass n relative to said fixed reference;
   (c) torque detecting means disposed to detect said torque for providing a torque means output signal which is related to said torque $(T_{app})$ at any instant of time;
   (d) solution means interconnected with said torque means and utilizing said torque means output signal as an input for generating the instantaneous value of a modal coordinate $(q_a)$ as a modal coordinate output signal in accordance with the continuous solution of the following differential equation:

$$\ddot{q}_a + K\dot{q}_a + K_1 q_a = K_2 T_{app}$$

where $K$, $K_1$ and $K_2$ are constants determined by the physical properties of said mechanical system and the normal mode transform; and
   (e) summing means interconnected with said first monitoring means, said second monitoring means and said solution means for summing said first monitoring means output signal, said second monitoring means output signal and said modal coordinate output signal to produce a summing means output signal which is related to the quantity $(\theta_{m+1} - \theta_m)$ even though the value $\theta_{m+1}$ has not been directly measured.

7. Apparatus for indirectly determining in a mechanical system the relative difference in instantaneous angular displacement ($\theta_{m+1}-\theta_m$) between any two adjacent rotating masses on a common resilient shaft to which is applied a driving torque ($T_{app}$) and on which the masses m and n are accessible for direct monitoring, where mass m+1 is not mass n, comprising:
   (a) first monitoring means disposed to monitor the mass m for providing a first monitoring means output signal which is related to the instantaneous displacement $\theta_m$ of said mass m relative to a fixed reference;
   (b) second monitoring means disposed to monitor said mass n for providing a second monitoring means output signal which is related to the instantaneous displacement $\theta_n$ of said mass n relative to said fixed reference;
   (c) modal coordinant determining means which is capable of determining a modal coordinant ($q_a$) for said mechanical system and for generating a modal coordinant output signal which is related thereto; and
   (d) summing means interconnected with said first monitoring means said second monitoring means and said modal coordinant determining means for summing said first monitoring means output signal, said second monitoring means output signal and said modal coordinant output signal to produce a summing means output signal which is related to the quantity ($\theta_{m+1}-\theta_m$) even though the value $\theta_{m+1}$ has not been directly measured.

8. The combination as claimed in claim 7 wherein said first monitoring means output signal is related to said instantaneous displacement $\theta_m$ by the value $d_m$.

9. The combination as claimed in claim 7 wherein said second monitoring means output signal is related to said instantaneous displacement $\theta_n$ by the value $e_m$.

10. The combination as claimed in claim 7 wherein said modal coordinate output signal is related to said modal coordinate ($q_a$) by the value $f_m$.

11. Apparatus for indirectly determining in an electrical generator-turbine system the relative shaft strain between the rotating generator and its exciter, where a low pressure and high pressure turbine are each disposed on the shaft for supplying torque thereto, and where only the exciter instataneous angular displacement and the high pressure turbine instantaneous angular displacement are available for direct monitoring, comprising:
   (a) first monitoring means disposed to monitor said exciter for providing a first monitoring means output signal which is related to the instantaneous angular displacement $\theta_x$ of said exciter relative to a fixed reference;
   (b) second monitoring means disposed to monitor said high pressure turbine for providing a second monitoring means output signal which is related to the instantaneous angular displacement $\theta_H$ of said high pressure turbine relative to said fixed reference;
   (c) torque detecting means disposed to detect said torque for providing a torque means output signal which is related to said torque ($T_{app}$) at any instant of time;
   (d) solution means interconnected with said torque means and utilizing said torque means output signal as an input for generating the instantaneous value of a modal coordinate ($q_a$) as a modal coordinate output signal in accordance with the continuous solution of the following differential equation, $$\ddot{q}_a + K\dot{q}_a + K_1 q_a = K_2 T_{app}$$

where K, $K_1$ and $K_2$ are constants determined by the physical properties of said electrical generator turbine system and the normal mode transform; and
   (e) summing means interconnected with said first monitoring means, said second monitoring means and said solution means for summing said first monitoring means output signal, said second monitoring means output signal and said modal coordinate output signal to produce a summing means output signal which is related to the quantity ($\theta_G-\theta_X$) even though the value $\theta_G$ has not been directly measured, and where $\theta_G$ equals the instantaneous angular displacement of said rotating generator and where said relative shaft strain is related to said quantity ($\theta_G-\theta_X$).

12. Apparatus for indirectly determining in an electrical generator-turbine system the relative shaft strain between the rotating generator and its exciter, where a low pressure and high pressure turbine are each disposed on the shaft for supplying torque thereto, and where only the exciter instantaneous angular displacement and the high pressure turbine instantaneous angular displacement are available for direct monitoring, comprising:
   (a) first monitoring means disposed to monitor said exciter for providing a first monitoring means output signal which is related to the instantaneous angular displacement $\theta_X$ of said exciter relative to a fixed reference;
   (b) second monitoring means disposed to monitor said high pressure turbine for providing a second monitoring means output signal which is related to the instantaneous angular displacement $\theta_H$ of said high pressure turbine relative to said fixed reference;
   (c) modal coordinate determining means which is capable of determining a modal coordinant ($q_a$) for said electrical generator-turbine system and for generating a modal coordinant output signal which is related thereto; and
   (d) summing means interconnected with said first monitoring means said second monitoring means and said modal coordinant determining means for summing said first monitoring means output signal, said second monitoring means output signal and said modal coordinant output signal to produce a summing means output signal which is related to the quantity ($\theta_G-\theta_X$) even though the value $\theta_G$ has not been directly measured, and where $\theta_G$ equals the instantaneous angular displacement of said rotating generator and where said relative shaft strain is related to said quantity ($\theta_G=\theta_X$).

13. Apparatus for indirectly determining in an electrical generator-turbine system the relative difference in strain between any two adjacent rotating masses on the common resilient shaft of said system, where the rotating masses comprise a generator (G), an exciter (X), a low pressure turbine (L) and a high pressure turbine (H), where the strains to be measured include the generator-exciter strain $K_A(\theta_G-\theta_X)$, the low pressure turbine-generator strain $K_B(\theta_L-\theta_G)$ and the high pressure generator-low power generator strain $K_C(\theta_H-\theta_L)$, where only the exciter and high pressure turbine are available for monitoring for determining the angular displacements $\theta_X$ and $\theta_H$ thereof respectively, and where said low and high pressure turbines as well as the connected electrical system provide torque ($T_{app}$) for rotating said generator and exciter; comprising (a) first monitoring means disposed to monitor said exciter for providing a first monitoring means output signal which is related to the instantaneous displacement $\theta_X$ of said exciter relative to a fixed reference;

(b) second monitoring means disposed to monitor said high pressure turbine for providing a second monitoring means output signal which is related to the instantaneous displacement $\theta_H$ of said high pressure turbine relative to said fixed reference;

(c) torque detecting means disposed to detect said torque for providing a torque means output signal which is related to said torque ($T_{app}$) at any instant of time;

(d) solution means interconnected with said torque means and utilizing said torque means output signal as an input for generating the instantaneous value of a modal coordinate ($q_a$) as a modal coordinate output signal in accordance with the continuous solution of the following differential equation:

$$\ddot{q}_a + K\dot{q}_a + K_1 q_a = K_2 T_{app}$$

where $K$, $K_1$ and $K_2$ are constants determined by the physical properties of said mechanical system and the normal mode transform; and (e) summing means interconnected with said first monitoring means, said second monitoring means and said solution means for summing said first monitoring means output signal, said second monitoring means output signal and said modal coordinate output signal to product a summing means output signal which is related to one of said quantities $(\theta_G - \theta_X)$, $(\theta_L - \theta_G)$ or $(\theta_H - \theta_L)$ so that a measure of shaft strain between appropriate adjacent rotating masses may be determined.

14. Apparatus for indirectly determining in an electrical generator-turbine system the relative difference in strain between any two adjacent rotating masses on the common resilient shaft of said system, where the rotating masses comprise a generator (G), an exciter (X), a low pressure turbine (L) and a high pressure turbine (H), where the strains to be measured include the generator-exciter strain $K_A(\theta_G - \theta_X)$, the low pressure turbine-generator strain $K_B(\theta_L - \theta_G)$ and the high pressure generator-low power generator strain $K_C(\theta_H - \theta_L)$, where only the exciter and high pressure turbine are available for monitoring for determining the angular displacements $\theta_X$ and $\theta_H$ thereof respectively, and where said low and high pressure turbines provide torque ($T_{app}$) for rotating said generator and exciter; comprising (a) first monitoring means disposed to monitor said exciter for providing a first monitoring means output signal which is related to the instantaneous displacement $\theta_X$ of said exciter relative to a fixed reference;

(b) second monitoring means disposed to monitor said high pressure turbine for providing a second monitoring means output signal which is related to the instantaneous displacement $\theta_H$ of said high pressure turbine relative to said fixed reference;

(c) modal coordinate determining means which is capable of determining a modal coordinant ($q_a$) for said electrical generator-turbine system and for generating a modal coordinant output signal which is related thereto; and (d) summing means interconnected with said first monitoring means said second monitoring means and said modal coordinant determining means for summing said first monitoring means output signal, said second monitoring means output signal and said modal coordinant output signal to produce a summing means output signal which is related to one of the quantities $(\theta_G - \theta_X)$, $(\theta_L - \theta_G)$ or $(\theta_H - \theta_L)$.

15. The combination as claimed in claim 14 wherein said first monitoring means output signal is related to said instantaneous displacement $\theta_X$ by the value $d_m$.

16. The combination as claimed in claim 14 wherein said second monitoring means output signal is related to said instantaneous displacement $\theta_H$ by the value $e_m$.

17. The combination as claimed in claim 14 wherein said modal coordinate output signal is related to said modal coordinate ($q_a$) by the value $f_m$.

18. The combination as claimed in claim 14 wherein said first monitoring meand output signal is related to the instantaneous displacement $\theta_X$ by the value $d_m$, said second monitoring means output signal is related to the instantaneous displacement $\theta_H$ by the value $e_m$, and said modal coordinate output signal is related to the modal coordinate $q_a$ by the value $f_m$.

19. Apparatus for indirectly determining in a mechanical system the relative difference in instantaneous angular displacement $(\theta_{m+1} - \theta_m)$ betweeen two rotating masses on a common resilient shaft where at least one of said angular displacements is not available for direct monitoring, and where the system can be adequately represented by an n x n modal transform, comprising:

modal coordinant determining means which is capable of determining (n−x) of the modal coordinants of said modal transform and for providing an output signal related to each;

monitoring means interconnected with said mechanical system for determining x measurable non-modal coordinant values for said system and for providing an output signal related to each; and summing means for receiving as inputs all mentioned output signals and for summing them to produce a summing means output signal which is related to the quantity $(\theta_{m+1} - \theta_m)$ even though said at least one of said angular displacements is not available for direct monitoring and even though only (n−x) modal coordinants of said modal transform are used.

20. The combination as claimed in claim 19 wherein a portion of said non-modal coordinant values are angular velocity measurements.

21. The combination as claimed in claim 19 wherein a portion of said non-modal coordinant values are angular acceleration measurements.

22. The combination as claimed in claim 19 wherein a portion of said non-modal coordinant values are strain measurements.

* * * * *